United States Patent Office 3,711,465
Patented Jan. 16, 1973

3,711,465
PROCESS FOR THE PREPARATION OF N-ALKYL-LACTAMS HAVING AT LEAST 10 RING MEMBERS
Heinz Lussi and Hans Dalla Torre, Domat-Ems-Grisons, Switzerland, assignors to Inventa AG, Zurich, Switzerland
No Drawing. Filed Mar. 17, 1970, Ser. No. 20,406
Claims priority, application Switzerland, Mar. 18, 1969, 4,029/69
Int. Cl. C07d 41/00
U.S. Cl. 260—239.3 R       18 Claims

ABSTRACT OF THE DISCLOSURE

The preparation of N-alkyllactams having at least 10 members. Reacting the lactam with dialkyl sulphate to form O-alkyllactim ether then saponifying the unconverted dialkyl sulphate by aqueous strong base, dry the O-alkyllactim and isomerize to produce the N-alkyllactam.

---

The present invention relates to a process for the preparation of N-alkyllactams having at least 10 ring members.

It is known that caprolactim ethers can be prepared by alkylation of caprolactam with an equimolar amount of a dialkyl sulphate (R. E. Benson and T. L. Cairns, J. Amer. Chem. Soc. 70, 2115 (1946); J. Körösi, J. prakt. Chem. (4) 23, 212 (1964)). As has been found, the lactim ethers of the two higher homologues, enanthlactam and capryllactam, can also be obtained in similar manner. With increasing ring size of the lactam used, however, the proportions converted with this method become smaller and smaller, so that said method is only poorly suited to the preparation of caprinlactim ethers and hardly at all for the production of laurinlactim ethers. The importance of the lactim ethers lies in the possibility of their isomerization to give the corresponding N-alkyllactams, which are of commercial importance, for example as intermediate products for the manufacture of plastics, agricultural chemicals, pharmaceuticals, etc.

The object of the present invention is a process for the preparation of N-alkyllactams having at least 10 ring members which is characterized in that the corresponding lactam is converted into the O-alkyllactim ether with dialkyl sulphate, the unconverted dialkyl sulphate is thereafter saponified by treatment with an aqueous strong base and the O-alkyllactim ether is then dried and isomerized in manner known per se to give the N-alkyl compound.

The high conversion values obtained in carrying the present invention into effect are the result of the use of more than equimolar amounts of the dialkyl sulphate, while the high yields obtained are due principally to the intermediate isolation of a practically pure lactim ether which is thereafter isomerized in a well controlled manner.

From the observations made by Benson and Cairns (see above), the fact that lactim ethers can be isolated after alkylation with an excess of dialkyl sulphate was surprising. In fact, in the alkylation of caprolactam, these authors found that the molar ratio of dialkyl sulphate to lactam and the way in which the reactants are added determine whether N-alkyllactam or O-alkyllactim ether is formed during the alkylation. This situation obviously does not apply in the case of lactams with a higher number of members.

The molar ratio of the dialkyl sulphate that is used to the lactam is advantageously between 1.2:1 to 6:1. In most cases, a molar ratio of 2:1 has proved to be favorable. Too small molar ratios result in low conversion values, while too large excesses of dialkyl sulphate are detrimental to the economy of the process. Suitable dialkyl sulphates are the lower alkyl sulphates such as diethyl and dimethyl, etc., sulphates to produce the corresponding alkyllactam.

The alkylation is preferably carried out at temperatures of 60–120° C.; the reaction time is advantageously 1–20 hours. It is a matter of course that the duration and the temperature of the reaction must be adapted to the nature of the starting compounds used and to their proportions. Reaction temperatures between 70° C. and 90° C. and reaction times between 2 and 6 hours have proved to be particularly advantageous.

An inert solvent, such as benzene or toluene, may be added to the reaction mixtures during the alkylation. In general, such an addition is not to be recommended, however, since it results in a reduction of the conversion value or amount converted. Should this addition prove to be necessary for other reasons, it must be kept as small as possible.

On the other hand, it is often advantageous, but not absolutely necessary, to carry out the subsequent alkaline treatment in the presence of an inert solvent immiscible with water, such as diethyl ether, dibutyl ether, benzene, toluene, cyclohexene, liquid paraffin hydrocarbons or mixtures thereof. The use of such solvents at the same time prevents the disturbing crystallization of unconverted lactam during the treatment and they act as entraining agents during the subsequently necessary separation of the aqueous phase (possibly with the formation of an azeotropic mixture). They are to be understood as aqueous alkaline solutions according to the present invention, aqueous solutions of the hydroxides and carbonates of the alkali metals. The use of aqueous sodium hydroxide has proved to be particularly suitable. Of course, the bases mentioned should be employed in an amount of more than one equivalent, and preferably 1.2 to 2 equivalents, per mol of dialkyl sulphate.

The treatment of the reaction mixture with the aqueous alkaline solution is best effected by allowing the reaction products, possibly diluted with an inert solvent, to run into the alkali while stirring well. A considerable rise in temperature occurs in the process.

The temperature obtained during the treatment with the alkali and the duration of treatment may be varied within very wide limits. All that is essential according to the present invention is that these parameters be so chosen that complete freeing of the organic phase from the excess dialkyl sulphate occurs.

If the alkylation is carried out with dimethyl sulphate, a subsequent 15-minute treatment with sodium hydroxide of about 20% strength at 30–60° C. is sufficient, although a longer period of treatment and a temperature up to 100° C. are permissible and do not reduce the yields obtained. If diethyl sulphate, which is more stable, has been used as alkylating agent, it is even necessary to carry out the treatment at temperatures in the vicinity of the boiling point and over a longer period. At temperatures below 20° C., a comparatively long time of treatment with alkalies is necessary so that, while operation under these conditions is still possible, it is nevertheless not advisable.

After the treatment with alkali has been completed and after separation of the aqueous phase, any organic solvent which has possibly been added is distilled off from the organic phase. If this solvent has a sufficiently high boiling point or forms an azeotrope with water, the crude lactim ether left behind is freed at the same time from residues of water, which are then separated in the condensate. The possibility of effecting drying represents another advantage of the simultaneous use of such solvents as benzene or toluene during the treatment with alkali.

Unconverted lactam is advantageously allowed to crystallize out in pure satisfactorily filterable form on cooling from the crude lactim ether obtained. After separation by filtration, this lactam can be reused without further treatment, if necessary, in a cyclic process.

The lactim ether obtained as filtrate is already very pure. It can be purified still further by distillation. For most purposes, however, this is unnecessary.

Since a very pure O-alkyllactim ether is now present, the subsequent isomerization to give the corresponding N-alkyllactam takes place under optimum and well-controllable conditions, as a result of which correspondingly high yields are obtained. The isomerization advantageously takes place in a temperature range of 60–160° C. and in the presence of catalytic additions of the corresponding dialkyl sulphate of an order of magnitude of, in particular, 0.01 to 0.3 mol per mol of lactim ether. At the same time, an inert solvent, for example an aromatic hydrocarbon, such as benzene or toluene, may be added for dilution.

The preparation of the N-alkyllactams by way of the lactim ethers affords a number of very important advantages in comparison with the methods heretofore known. In particular, the high yields of the process, which have not been attained heretofore, are to be noted and the fact that unconverted lactam can be recovered in very pure form by simple filtration. Moreover, the process is outstandingly suitable for carrying into effect commercially both in batchwise and in continuous operation.

If the saponification of N-alkyllactam to give ω-N-alkylaminocarboxylic acid is desired, the mixtures of the N-alkyllactams with the dialkyl sulphate added as catalyst which are obtained after the isomerization may be saponified directly. It is only necessary to distil off beforehand any solvent which has possibly been added. During the saponification, the dialkyl sulphate decomposes into sulphuric acid and the corresponding alcohol. The N-alkyllactams obtained according to the invention are suitable for the manufacture of polyamides (R. C. P. Cubben, Makromolekulare Chem. 80, 44 (1964); BASF, British Pat. 869,079 (May 31, 1961)), for producing high-grade hardening systems for epoxy resins and as plasticizers for plastics. The O-alkyllactim ethers occurring as intermediate products in the preparation of these N-alkyllactams may likewise be used to produce special polyamides (P. Cefelin, E. Sittler and O. Wichterle, Collection Czech. Chem. Communs. 25, 2522 (1960); Chem. Abstr. 55, 3608 et seq. (1961)).

EXAMPLE 1

A suspension of 455 g. (2.3 mols) of laurinlactam in 437 ml. (=580 g.=4.6 mols) of dimethyl sulphate is kept at 70° C. for 4 hours while stirring. After cooling to room temperature, the mixture is diluted with 575 ml. of toluene and, while stirring vigorously, is poured into a solution of 276 g. (6.9 mols) of sodium hydroxide in 966 ml. of water. In the process, the temperature rises spontaneously from 20° C. to 60° C. After the mixture has been stirred for 15 minutes, the aqueous phase is separated in a separating funnel. The toluene is distilled off under low vacuum from the organic phase on top, a few drops of water passing over at the same time. On cooling, 60 g. of unchanged laurinlactam crystallize out from the residue and are filtered off with suction and can be added directly to a fresh prepared mixture in lieu of fresh lactam. The filtrate consists of practically pure O-methyllaurinlactim ether which can be further purified by distillation with an oil pump under vacuum.

Boiling point 101–3° C./0.3 mm. Hg
$n_D^{20}=1.4827$
$d^{21}=0.9471$

Analysis.—$C_{13}H_{25}NO$: Found (percent): C, 74.11; H, 12.23; N, 6.66. Calculated (percent): C, 73.88; H, 11.92; N, 6.63.

Yield: 396 g.=93.5% referred to lactam converted.
Conversion: 87% referred to lactam used.

105.5 g. (0.5 mol) of distilled O-methyllaurinlactim ether obtained in this way are heated together with 110 ml. of toluene and 6.6 g. (0.052 mol) of dimethyl sulphate for 6 hours under reflux. The mixture boils at 125° C. The toluene is thereafter distilled off under low vacuum and the residue is fractionally distilled with an oil pump. 96 g. of N-methyllaurinlactam pass over at 120–7° C./0.3 mm. Hg.

$n_D^{20}=1.4968$; $d^{21}=0.9802$
Yield: 91% referred to lactim ether used.

Similar results are obtained when amounts of 385 g. (6.9 mols) of potassium hydroxide are employed instead of sodium hydroxide and the same procedure as is indicated hereinbefore is followed in other respects.

EXAMPLE 2

197 g. (1 mol) of laurinlactam and 190 ml. (253 g.=2 mols) of dimethyl sulphate are reacted with one another for 4 hours at 85° C. while stirring. After cooling to 50° C., the mixture is diluted with 250 ml. of toluene and is poured, while stirring, onto a saturated solution of 212 g. (2 mols) of sodium carbonate in 420 ml. of water, which still contains part of the sodium carbonate in undissolved form. In the process, the temperature rises to only about 30° C. After stirring has been continued for one hour, precipitated products are filtered off and the aqueous layer is separated. The organic phase is again worked up as described in Example 1. 27 g. of unchanged laurinlactam are recovered and 90 g. of O-methyllaurinlactin ether are isolated by distillation. The undistilled O-methyllaurinlactim ether prepared in accordance with the preceding section (about 2 mols) is so added at 100° C., while stirring, to a mixture of 50 ml. of N-methyllaurinlactam (from an earlier test) and 20 ml. (26 g.=0.2 mol) of dimethyl sulphate that the temperature is kept between 90 and 105° C. A boiling water bath is advantageously used to heat the reaction vessel. After the addition has been completed, the mixture is allowed to finish reacting for another hour at 96° C. On subsequent distillation, 438 g. of N-methyllaurinlactam are isolated. Yield after deducting the product put in first, referred to converted laurinlactam: 92% of the theoretical.

EXAMPLE 3

Similarly to Example 1, 338 g. (2 mols) of caprinlactam are reacted with 504.5 g. (4 mols) of dimethyl sulphate for 4 hours at 70° C. The mixture is thereafter diluted with 500 ml. of benzene and the solution obtained is stirred together for 15 minutes with 240 g. (6 mols) of sodium hydroxide in 840 ml. of water. The temperature rises spontaneously from 20 to 60° C. After separation of the aqueous phase and after the benzene has been distilled off, 35.5 g. of unconverted caprinlactam crystallize out from the crude O-methylcaprinlactim ether on cooling and are filtered off. On subsequent distillation, 315 g. of O-methylcaprinlactim ether (boiling point 80–4° C./0.2 mm. Hg, $n_D^{20}=1.4818$, $d^{20}=0.9585$) are obtained.

Yield: 96% referred to lactam converted
Conversion: 90% referred to lactam used.

277.1 g. (1.51 mols) of the O-methylcaprinlactim ether obtained in this way are heated in 275 ml. of benzene, with the addition of 14.2 ml. (0.15 mol) of dimethyl sulphate, for 15 hours at 94° C. under reflux and then distilled. 267 g. N-methylcaprinlactam (boiling point 92° C./0.1 mm. Hg, $n_D^{20}=1.5008$; $d^{20}=1.0012$) are obtained.

Yield: 96.2% referred to lactim ether used,
92.5% referred to caprinlactam consumed.

We claim:

1. Process for the preparation of N-alkyllactams having at least 10 ring members, comprising reacting the corresponding lactam with dialkyl sulphate to form O-alkyllactim ether, saponifying the unconverted dialkyl sulphate by treatment with an aqueous strong base, drying the O-alkyllactim ether and isomerizing the O-alkyllactim to produce the N-alkyllactam.

2. The process according to claim 1, wherein more than 1 mol of dialkyl sulphate is used for every mol of lactam.

3. The process according to claim 1, wherein sodium hydroxide is employed as the aqueous strong base.

4. The process according to claim 1, wherein dimethyl sulphate is employed as the dialkyl sulphate.

5. The process according to claim 1, wherein the drying of the O-alkyllactim ether includes the step of distilling out the water by means of a hydrocarbon solvent as entraining agent.

6. The process according to claim 1 including separating the unconverted lactam prior to isomerizing the O-alkyllactim ether to give the N-alkyllactam.

7. The process according to claim 1 including isomerizing the O-alkyllactim ether to give the N-alkyllactam in the presence of dialkyl sulphate.

8. The process of claim 1 wherein the base is present in the amount of 1.2–2 equivalents per mol of dialkyl sulphate.

9. The process of claim 1 wherein the dialkyl sulphate is present in the molar ratio of 1.2:1 to 6:1 to the lactam.

10. The process of claim 7 wherein the base is selected from the hydroxides and carbonates of alkali metals.

11. The process of claim 2 wherein the dialkyl sulphate is present in the molar ratio of 1.2:1 to 6:1 to the lactam.

12. The process of claim 11 wherein the base is selected from the hydroxides and carbonates of alkali metals.

13. The process of claim 11 wherein the drying of the O-alkyllactim ether includes the step of distilling out the water by means of a hydrocarbon solvent as entraining agent.

14. The process of claim 11 including separating the unconverted lactam prior to isomerizing the O-alkyllactim ether to give the N-alkyllactam.

15. The process of claim 11 including isomerizing the O-alkyllactim ether to give the N-alkyllactam in the presence of dialkyl sulphate.

16. The process of claim 11 wherein dimethyl sulphate is employed as dialkyl sulphate.

17. The process of claim 11 wherein the base is selected from the hydroxides and carbonates of alkali metals, the drying of the O-alkyllactim ether includes the step of distilling out the water by means of a hydrocarbon solvent as entraining agent, separating the unconverted lactam prior to isomerizing the O-alkyllactim ether to give the N-alkyllactam, and isomerizing the O-alkyllactim ether in the presence of dialkyl sulphate to give the N-alkyllactam.

18. The process of claim 1 including the molar ratio of dialkyl sulphate to lactam is 1.2:1 to 6:1 at the temperature of 60–120° C. for 1–20 hours and including isomerizing the O-alkyllactim ether by maintaining a temperature of 60–160° C. and adding .01 to .3 mol of dialkyl sulphate per mol of the lactim ether.

References Cited

Benson et al., J. Am. Chem. Soc., vol. 70, pp. 2115–2118 (1948).

Buehel et al., Berichte, vol. 99, No. 3, pp. 727–36 (1966).

HENRY R. JILES, Primary Examiner

R. T. BOND, Assistant Examiner

U.S. Cl. X.R.

20—239.3 A